US010774932B2

(12) United States Patent
Hocker et al.

(10) Patent No.: US 10,774,932 B2
(45) Date of Patent: Sep. 15, 2020

(54) SEALING ELEMENT AND METHOD FOR PRODUCING A SEALING ELEMENT

(71) Applicants:ElringKlinger AG, Dettingen (DE); ElringKlinger Kunststofftechnik GmbH, Bietigheim-Bissingen (DE)

(72) Inventors: Klaus Hocker, Ingersheim (DE); Walter Schuhmacher, Bietigheim-Bissingen (DE); Patrick Klein, Leinfelden-Echterdingen (DE); Fabian Kopp, Tamm (DE); Claudia Stern, Tannhausen (DE)

(73) Assignees: ElringKlinger AG, Dettingen (DE); ElringKlinger Kunststofftechnik GmbH, Bietigheim-Bissingen (DE)

( * ) Notice: Subject to any disclaimer, the term of this patent is extended or adjusted under 35 U.S.C. 154(b) by 0 days.

(21) Appl. No.: 15/606,215

(22) Filed: May 26, 2017

(65) Prior Publication Data

US 2017/0261104 A1 Sep. 14, 2017

Related U.S. Application Data

(63) Continuation of application No. PCT/EP2015/077946, filed on Nov. 27, 2015.

(30) Foreign Application Priority Data

Nov. 28, 2014 (DE) .......................... 10 2014 224 378

(51) Int. Cl.
*F16J 15/16* (2006.01)
*F16J 15/3284* (2016.01)
(Continued)

(52) U.S. Cl.
CPC ....... *F16J 15/3284* (2013.01); *B29C 45/0001* (2013.01); *B29C 45/0055* (2013.01);
(Continued)

(58) Field of Classification Search
CPC ...... F16J 15/32; F16J 15/3204; F16J 15/3232; F16J 15/3236
See application file for complete search history.

(56) References Cited

U.S. PATENT DOCUMENTS 2,424,225 A * 7/1947 Dick .................... F16J 15/32
92/135
2,717,025 A 9/1955 Jelinek
(Continued)

FOREIGN PATENT DOCUMENTS

BE 1015922 11/2005
DE 201 09 891 10/2001
(Continued)

OTHER PUBLICATIONS

Franck, Adolf and Biederbick, Karlheinz. *Kunststoff-Kompendium*, Revised Edition. Bird Book Publishing, 1990. pp. 83-90, 92, 360.

*Primary Examiner* — Gilbert Y Lee
(74) *Attorney, Agent, or Firm* — Womble Bond Dickinson (US) LLP

(57) ABSTRACT

In order to provide a sealing element which ensures a reliable seal and which can be produced easily and economically, it is proposed that a main body of the sealing element is preferably formed from a partially fluorinated or fully fluorinated thermoplastic material and has obtained at least part of its final outer shape or only part of its final outer shape in particular in a high-pressure process and/or in a high-temperature process.

30 Claims, 8 Drawing Sheets

(51) Int. Cl.
  *B29C 45/00* (2006.01)
  *F16J 15/3236* (2016.01)
  *F16J 15/328* (2016.01)
  *F16J 15/3208* (2016.01)
  *B29C 45/37* (2006.01)

(52) U.S. Cl.
  CPC ............ *B29C 45/37* (2013.01); *F16J 15/328* (2013.01); *F16J 15/3208* (2013.01); *F16J 15/3236* (2013.01)

(56) References Cited

U.S. PATENT DOCUMENTS

| | | | |
|---|---|---|---|
| 3,281,512 | A | 10/1966 | Reiling |
| 3,608,037 | A | 9/1971 | Genz |
| 3,689,081 | A | 9/1972 | Kinberg |
| 4,417,503 | A | 11/1983 | Izumi |
| 4,655,945 | A | 4/1987 | Balsells |
| 5,577,777 | A | 11/1996 | Singh et al. |
| 5,664,651 | A | 9/1997 | Miura et al. |
| 5,695,197 | A | 12/1997 | Farley et al. |
| 6,189,894 | B1 | 2/2001 | Wheeler |
| 6,557,857 | B1 | 5/2003 | Goodman |
| 6,737,165 | B1 | 5/2004 | Smith et al. |
| 6,759,470 | B2 | 7/2004 | Sukegawa et al. |
| 6,930,142 | B2 | 8/2005 | Yanagiguchi et al. |
| 7,959,159 | B2 | 6/2011 | Hocker et al. |
| 8,480,092 | B2 | 7/2013 | Hatch |
| 8,814,170 | B2 | 8/2014 | Okamura et al. |
| 9,182,041 | B2 | 11/2015 | Daub et al. |
| 10,145,474 | B2 | 12/2018 | Schuhmacher et al. |
| 2005/0184468 | A1 | 8/2005 | Aoshiba et al. |
| 2007/0057472 | A1 | 3/2007 | Hatch |
| 2008/0122184 | A1* | 5/2008 | Hocker ............... F02M 59/442 277/366 |
| 2010/0043891 | A1 | 2/2010 | Wilke et al. |
| 2010/0225072 | A1 | 9/2010 | Fukushima et al. |
| 2010/0264603 | A1 | 10/2010 | Schroeder et al. |
| 2011/0037234 | A1* | 2/2011 | Balsells ............... F16J 15/3212 277/562 |
| 2011/0272892 | A1 | 11/2011 | Grace et al. |
| 2013/0043660 | A1* | 2/2013 | Daub ................... F16J 15/3212 277/500 |
| 2014/0197599 | A1 | 7/2014 | Nahrwold et al. |
| 2015/0285390 | A1 | 10/2015 | Grau et al. |
| 2016/0146347 | A1* | 5/2016 | Hunger ............... F15B 15/1461 277/437 |

FOREIGN PATENT DOCUMENTS

| | | |
|---|---|---|
| DE | 10 2007 063 216 | 6/2009 |
| DE | 10 2011 117 820 | 5/2013 |
| DE | 10 2012 112 594 | 7/2014 |
| DE | 10 2014 225 319 | 6/2016 |
| GB | 940 903 | 11/1963 |
| GB | 1 494 214 | 12/1977 |
| JP | H10-103528 | 4/1998 |
| JP | 2000-161497 | 6/2000 |
| JP | 2009-216168 | 9/2009 |
| WO | WO 2007/033072 | 3/2007 |
| WO | WO 2007/082111 | 7/2007 |
| WO | WO 2014/095276 | 6/2014 |

* cited by examiner

SEALING ELEMENT AND METHOD FOR PRODUCING A SEALING ELEMENT

RELATED APPLICATION

This application is a continuation of international application No. PCT/EP2015/077946 filed on Nov. 27, 2015, and claims the benefit of German application No. 10 2014 224 378.5 filed on Nov. 28, 2014 which are incorporated herein by reference in their entirety and for all purposes.

FIELD OF DISCLOSURE

The present invention relates to a sealing element, in particular for use as a rod seal, piston seal and/or shaft seal.

Such a sealing element is known by way of example from DE 10 2012 112 594 A1.

SUMMARY OF THE INVENTION

The object of the present invention is to provide a sealing element which ensures a reliable seal and which can be produced easily and economically.

This object is achieved by way of example by a sealing element according to claim 1.

It can be favorable if the sealing element comprises a main body made of a thermoplastic material, wherein the main body has obtained at least part of its final outer shape in a high-pressure process and/or in a high-temperature process.

Alternatively, it can be provided that the sealing element comprises a main body made of a thermoplastic material, wherein the main body has obtained only part of its final outer shape in a high-pressure process and/or in a high-temperature process.

The sealing element, in particular the main body of the sealing element, is preferably produced with near net shape.

A final outer shape is in particular the shape that the main body has in the state of use of the sealing element or in the state ready for use.

A final outer shape is also in particular a shape in which there is no further processing, for example no re-shaping of the surface, before the main body is used as intended as part of the sealing element.

It can be advantageous if the main body, at least in part or only in part, has a surface finish which comprises a body shaped and/or completed in a high-pressure process and/or in a high-temperature process.

It can be advantageous if the main body, at least in part or only in part, has a surface finish which comprises a body shaped and/or completed in an injection molding process.

In one embodiment of the invention it can be provided that the main body is substantially annular.

The main body preferably comprises one or more radially inner sealing portions and also one or more radially outer sealing portions with respect to the annular shape.

For simplification, the sealing portions will be discussed hereinafter in the singular. However, a plurality of sealing portions having one or more of the mentioned features can of course also be provided at all times.

The main body can be of circular annular shape by way of example.

A radially inner sealing portion serves preferably to provide a dynamic seal on a movable element, in particular a piston, a rod, or a shaft.

A radially outer sealing portion serves preferably to provide a static seal on a housing of a sealing device.

It can be favorable if the radially inner sealing portion and/or the radially outer sealing portion has obtained its final outer shape in the high-pressure process and/or in the high-temperature process.

It can be provided here that only the radially inner sealing portion or only the radially outer sealing portion or both the radially inner sealing portion and the radially outer sealing portion have obtained the final outer shape in the high-pressure process and/or in the high-temperature process.

Alternatively or additionally, it can be provided that a radially inner sealing portion and/or a radially outer sealing portion have obtained the respective final outer shape by means of a finishing operation, for example a machining operation.

In a further development of the invention it can be provided that the main body comprises two ends which are opposite one another with respect to an axial direction and which in particular in the state of use of the sealing element come into contact with fluids to be separated from one another.

Only one of the ends or both ends have obtained the final outer shape preferably in the high-pressure process and/or in the high-temperature process.

Alternatively or additionally, it can be provided that only one of the ends or both ends have obtained the final outer shape by means of a finishing operation, for example a machining operation.

One end or both ends are preferably provided with one or more spring element receptacles for receiving one or more spring elements.

It can be favorable if the main body comprises a thermoplastic material which in particular can be injection molded, or is formed from a thermoplastic material which in particular can be injection molded.

The thermoplastic material can be in particular a fluoro-thermoplastic material, for example a fully fluorinated thermoplastic material.

The main body is preferably an injection-molded component, in particular a plastics injection-molded component.

The sealing element can be a spring-loaded groove ring, for example.

The sealing element then preferably comprises one or more spring elements, which for example are formed from a spring steel and have an annular shape at least roughly.

Here, one or more spring elements by way of example can have a U-shaped, V-shaped or L-shaped cross-section as considered at right angles to a circumferential direction.

One or more spring elements are preferably self-gripping, in particular in such a way that the one spring element or the plurality of spring elements are fixable without undercut in the spring element receptacle of the sealing element.

The present invention also relates to the use of a sealing element, in particular a sealing element according to the invention, as a rod seal, piston seal and/or shaft seal.

Here, the sealing element is preferably used in a fuel pump and/or a piston pump for sealing two media spaces.

The use according to the invention preferably has one or more of the features and/or advantages described in conjunction with the sealing element according to the invention.

The present invention also relates to a method for producing a sealing element.

In this regard, the object of the invention is to provide a method by means of which a sealing element that provides a reliable seal can be produced easily and economically.

This object is achieved in accordance with the invention by a method according to the independent method claim.

The method preferably comprises the following: producing a main body of the sealing element from a thermoplastic material, wherein the main body obtains at least part of its final outer shape or only part of its final outer shape in a high-pressure process and/or in a high-temperature process.

The method according to the invention preferably has one or more of the features and/or advantages described in conjunction with the sealing element according to the invention and/or the use according to the invention.

It can be favorable if the high-pressure process comprises an embossing process, a press molding process, an injection molding process and/or a diecasting process.

The main body thus obtains at least part of its final outer shape or only part of its final outer shape preferably in an embossing process, a press molding process, an injection molding process and/or a pressure diecasting process.

Alternatively or additionally, it can be provided that the high-temperature process comprises a hot embossing process, a hot press molding process, an injection molding process, a casting process, a sintering process and/or a thermoforming process.

The main body thus obtains at least part of its final outer shape or only part of its final outer shape preferably in a hot embossing process, a hot press molding process, an injection molding process, a casting process, a sintering process and/or a thermoforming process.

It can be favorable if the main body of the sealing element is subjected to a finishing operation only in part after the high-pressure process and/or the high-temperature process have/has been performed.

By way of example, a partial finishing only on one side can be provided, in particular a one-sided finishing axially and/or radially.

However, it can also be provided that the main body is subjected to a finishing operation on both sides in the axial direction and/or on both sides in the radial direction.

The main body is preferably machined.

Alternatively or additionally, it can be provided that the main body is coated for the finishing or as the finishing.

One or more sealing portions of the sealing element are preferably produced by a processing of the main body.

By way of example, it can be provided that one or more dynamic sealing portions of the sealing element and/or one or more static sealing portions of the sealing element are produced by a processing, in particular a machining, of the main body.

One or more spring element receptacles for receiving one or more spring elements are preferably not subjected to a finishing operation, but instead obtain their final outer shape preferably in the high-pressure process and/or in the high-temperature process.

It can be particularly advantageous if the main body is produced from partially fluorinated or fully fluorinated thermoplastic material which preferably is injection-moldable.

It can be provided that the main body is formed from pure PTFE material.

The thermoplastic material (plastics material) is preferably melt-processable.

The plastics material used is preferably a TFE copolymer with a comonomer content of more than 0.5 wt. %. By means of a comonomer content of this order, the molecular weight of the polymer chains can be reduced without detriment to the mechanical strength of the material, and therefore the melt viscosity is reduced and processing by means of injection molding is made possible.

The comonomer is preferably selected from a perfluoroalkyl vinyl ether, in particular perfluoromethyl vinyl ether, hexafluoropropylene and perfluoro-(2,2-dimethyl-1,3-dioxole). Depending on the comonomer content, the fully fluorinated thermoplastic is then what is known as a melt-processable PTFE (comonomer content up to approximately 3 wt. %), a PFA (more than approximately 3 wt. % perfluoroalkyl vinyl ether as comonomer), an MFA (more than approximately 3 wt. % perfluoromethyl vinyl ether as comonomer), or an FEP (more than approximately 3 wt. % hexafluoropropylene as comonomer).

The TFE copolymer can also comprise different comonomers. It is also possible that the fully fluorinated thermoplastic comprises a mixture of different TFE copolymers.

The material of the main body can be formed in part or substantially completely from the fully fluorinated thermoplastic. Alternatively or additionally, the material can comprise one or more fillers, in particular pigments, friction-reducing additives and/or additives increasing the thermal resistance, in order to further optimize the properties of the sealing element and to adapt these to the relevant requirements.

The sealing element is suitable in particular for sealing pistons in high-pressure fuel pumps or piston pumps for brake systems (ABS, ESP, etc.).

In particular, a thermoplastic material that is resistant to high-temperature and/or chemicals, in particular PEEK, PEAK, PEI, etc., and/or a compound material comprising one or more of the above-mentioned materials can also be used as thermoplastic material.

A high dimensional stability of the thermoplastic material can be attained in particular by production of the main body of the sealing element in an injection molding process so as to ultimately seal off higher pressures in particular.

The high-pressure process is in particular a high-pressure forming process.

The high-temperature process is preferably a high-temperature forming process and/or a high-temperature conversion process.

It can be provided that the high-pressure process and/or the high temperature process are the only process steps or step for producing the main body.

Alternatively, further process steps can be carried out in order to produce the main body.

By way of example, in order to produce a main body of a sealing element, it can be provided that the thermoplastic material is pre-fabricated in an extrusion process, in particular a ram extrusion process, and is then brought into the final outer shape by grinding and milling, turning, or other machining operation.

It can also be provided that a main body of a sealing element is produced by carrying out the following method steps: extruding the thermoplastic material, in particular melt-extruding the thermoplastic material; grinding; machining in a turning machine; hot embossing; CNC finishing, in particular in order to produce an inner contour, for example one or more radially inner sealing portions.

It can be provided that a main body of the sealing element obtains at least part of its final outer shape or only part of its final outer shape or its entire final outer shape by means of turning and/or machining.

By way of example, it can be provided that an inner side or underside of the main body facing towards the movable component in the mounted state of the sealing element is subjected to a finishing operation after a shaping step.

In particular, one or more sealing edges and/or indentations can be formed and/or subjected to a finishing operation by turning and/or machining.

The turning and/or machining can be performed by way of example with use of an axially and radially movable tool, which is guided axially and radially along the main body in accordance with the inner contour of the main body to be produced.

It can also be provided that the turning and/or machining is performed by way of example with use of a tool which comprises a processing edge, in particular a processing blade, complementary to the inner contour of the main body to be produced. The tool preferably can be guided on the main body from the inside out in a radial direction, in particular in such a way that the desired inner contour is completed in a processing step without axial movement.

In a further embodiment it can be provided that a main body of the sealing element is produced by carrying out the following method steps: pressing a blank; carrying out a sintering process; hot embossing; CNC processing, in particular in order to produce an inner contour, for example one or more radially inner sealing portions.

A main body of a sealing element can also be produced for example by carrying out the following method steps: pressing a blank; carrying out a sintering process; CNC processing of the main body, in particular in order to produce an outer contour and/or an inner contour, for example in order to produce one or more radially inner sealing portions and/or one or more radially outer sealing portions.

A main body of a sealing element can also be produced by carrying out the following method steps: granulating a starting material; using this starting material in an injection molding process in order to produce the main body; subjecting the main body to a finishing operation as appropriate, in particular CNC processing in order to produce an inner contour, for example one or more radially inner sealing portions.

A completed main body can be connected as appropriate to further components of the sealing element, or can be assembled thereon, and finally packaged.

The geometry of the sealing lips has a decisive influence on the tightness and the longevity of the sealing element. Consequently, the selection of the optimal geometry is one of the key challenges in the production of a sealing element.

By way of example, the lip geometry with a preferred lip thickness and a preferred lip contact angle together with a spring force and an overlap of the seal profile relative to a diameter of the movable component (in particular piston rod diameter) result in the radial force, which is very important for the dynamic tightness. The sealing edges of the dynamic sealing lips load the movable component with this radial force.

This radial force is decisive for the setting of the surface pressure distribution in the sealing regions and also has a decisive influence on the service life of such a sealing element. Excessively high radial forces lead to increased wear of the sealing element and accordingly to early failure thereof. By contrast, insufficient radial forces lead to an inadequate tightness of the sealing element.

An optimal setting of the radial force results in a surface pressure distribution in the region of the sealing edges which allows the best-possible recovery of the removed lubricating film. This surface pressure distribution is dependent on the geometry of the sealing lip as a whole, on the geometry of the sealing edges, on the geometry and the spring properties of the spring element, and on the changes over time to the geometries and the spring properties, caused by wear and deformation of the sealing element.

A further challenge is the demolding of a double-acting seal in the injection molding process, if this shaping process is selected for production of at least a portion of the sealing element. Optimally formed sealing lips and sealing edge geometries would be heavily deformed during the demolding of the inner core at the temperature prevailing in the mold. For this reason, the inner geometry of the sealing lip/sealing edges must be changed so that the demolding can be performed without excessively damaging the sealing edges. A number of measures have proven to be advantageous for this purpose. In particular, a finite element simulation of the demolding process on earlier geometries has led to astonishing results.

It has surprisingly been found that the distribution of the radial forces over the sealing edges during the demolding is important.

In order to provide a simpler description of the geometry of the sealing element, all details in this description are oriented preferably towards a cross-section of the sealing element in a plane running through the axis of symmetry. Any one-dimensional and/or point-related details consequently result in lines or curves, in particular annular curves, with interpolation to the entire sealing element. Any two-dimensional and/or line-related or curve-related details consequently result in surfaces, in particular annular surfaces, with interpolation to the entire sealing element. Any two-dimensional and/or surface-related details consequently result in spaces, in particular annular spaces, with interpolation to the entire sealing element.

By way of example, it is advantageous if a spacing between a sealing edge and a recess, which adjoins said sealing edge in a manner directed inwardly in the axial direction, is at least roughly of equal size for each sealing edge.

A spacing in this description and the accompanying claims is in particular:

(i) a spacing along a direction running parallel to an upper side or surface of the sealing lip facing away from the at least one sealing edge, or (ii) a spacing along a direction running at right angles to an upper side or surface of the sealing lip facing away from the at least one sealing edge, or (iii) a spacing along a direction running parallel to the axis of symmetry of the sealing element, i.e. a spacing in the axial direction, or (iv) a spacing along a direction running at right angles to the axis of symmetry of the sealing element, i.e. a spacing in the radial direction.

A recess in this description and the accompanying claims is in particular:

(i) a point of an indentation in the sealing lip which locally has a maximum spacing from the axis of symmetry in relation to the radial direction, or (ii) a point of an indentation in the sealing lip which locally has a minimum spacing from an upper side or surface of the sealing lip, in particular in relation to a direction of thickness of the sealing lip, or (iii) the indentation as a whole.

By way of example, a spacing between a sealing edge which is an outer sealing edge in the axial direction and a recess adjoining this sealing edge in a manner directed inwardly in the axial direction can be at least approximately 0.5 mm, preferably at least approximately 0.6 mm.

Furthermore, a spacing between a sealing edge which is an outer sealing edge in the axial direction and a recess adjoining this sealing edge in a manner directed inwardly in the axial direction can be at most approximately 1.5 mm, preferably at most approximately 1.0 mm, in particular at most approximately 0.9 mm, for example approximately 0.8 mm.

By way of example a spacing between a sealing edge which is an inner sealing edge in the axial direction and a recess adjoining said sealing edge in a manner directed inwardly in the axial direction can be at least approximately 0.5 mm, preferably at least approximately 0.6 mm.

Furthermore, a spacing between a sealing edge which is an inner sealing edge in the axial direction and a recess adjoining this sealing edge in a manner directed inwardly in the axial direction can be at most approximately 2.5 mm, preferably at most approximately 1.0 mm, in particular at most approximately 0.9 mm, for example approximately 0.8 mm.

The recess which adjoins a sealing edge in a manner directed inwardly in the axial direction is in particular an undercut that has an effect when removing the sealing element from an injection mold.

A spacing between a sealing edge and a recess adjoining said sealing edge in a manner directed inwardly in the axial direction is in particular a flank length of the sealing edge.

By way of example, the flank lengths of adjacent sealing edges of a sealing lip or all sealing lips differ from one another by at most approximately 15%, preferably at most approximately 5%.

It can be favorable if a flank length of the sealing edge which is an inner sealing edge in the axial direction is smaller than a flank length of the sealing edge which is an outer sealing edge in the axial direction, for example by at least 0.05 mm, in particular at least approximately 0.1 mm, and/or by at most approximately 0.2 mm, in particular at most approximately 0.15 mm. In this way, the radial force can temporarily load the primary sealing edge more heavily for example as the sealing element is demolded. The primary sealing edge is arranged further outwardly in the axial direction and is more flexible than the secondary sealing edge, which is an inner sealing edge in the axial direction. In spite of the temporarily heavier loading, the primary sealing edge is therefore preferably at a lower risk of being plastically deformed.

It can also be provided that a flank length of the sealing edge which is an outer sealing edge in the axial direction is smaller than a flank length of the sealing edge which is an inner sealing edge in the axial direction, for example by at least approximately 0.05 mm, in particular at least approximately 0.1 mm, and/or by at most approximately 0.2 mm, in particular at most approximately 0.15 mm.

A sealing edge angle which is enclosed on the one hand by a flank of a sealing edge adjoining said sealing edge in a manner directed inwardly in the axial direction and on the other hand by an axis of symmetry of the sealing element is preferably of at least roughly equal size for each sealing edge.

The sealing edge angles of adjacent sealing edges of a sealing lip or all sealing lips preferably differ from one another by at most approximately 15%, preferably at most approximately 5%.

A sealing edge which is an outer sealing edge in the axial direction is preferably a primary sealing edge.

A sealing edge which is an inner sealing edge in the axial direction is preferably a secondary sealing edge, in particular if no further sealing edge is arranged between the outer sealing edge and the inner sealing edge.

By suitable selection of the flank lengths and/or the sealing edge angles, the radial load, which weighs on both sealing edges, during the demolding is preferably distributed uniformly and for a longer time over both sealing edges. Both sealing edges are thus preferably simultaneously raised and lowered again during the demolding.

A diameter of the movable component is preferably at least approximately 4 mm, for example at least approximately 5 mm, and/or at most approximately 18 mm, for example at most approximately 13 mm.

The movable component is in particular a piston rod.

It has surprisingly been found that smaller radii at the sealing edges are more sensitive to forced demolding than larger radii. Accordingly, larger radii are more easily demolded than smaller radii. As a result of the demolding, the sealing edges experience a certain plastic deformation, since the temperature prevailing during the demolding is high and the material at this temperature often does not have a sufficiently high strength to fully maintain its shape. The radii can then be distorted by plastic deformation.

A reliable sealing effect alongside good demolding behavior is provided in particular if the following parameters are observed:

a sealing edge radius of a sealing edge which is an inner sealing edge in the axial direction is preferably at least approximately 0.1 mm, in particular at least approximately 0.15 mm, for example approximately 0.2 mm;

a sealing edge radius of a sealing edge which is an inner sealing edge in the axial direction is preferably at most approximately 0.5 mm, in particular at most approximately 0.25 mm;

a sealing edge radius of a sealing edge which is an outer sealing edge in the axial direction is preferably at least approximately 0.1 mm, in particular at least approximately 0.15 mm, for example approximately 0.2 mm;

a sealing edge radius of a sealing edge which is an outer sealing edge in the axial direction is preferably at most approximately 0.5 mm, in particular at most approximately 0.25 mm;

a radius of curvature of an indentation which is an inner indentation in the axial direction is preferably at least approximately 0.1 mm, in particular at least approximately 0.15 mm, for example approximately 0.2 mm;

a radius of curvature of an indentation (between two sealing edges) which is an outer indentation in the axial direction is preferably at most approximately 0.3 mm, in particular at most approximately 0.25 mm.

The sealing lip geometries that have proved their worth in sealing systems of fuel pumps can prove to be too stable and/or too stiff to be satisfactorily demolded, in particular with the use of fluoro-thermoplastics which can be injection molded on account of the higher rigidity compared to materials based on PTFE.

It has proven to be advantageous if a sealing lip thickness at a narrowest point on an inner side of a sealing edge which is an inner sealing edge in the axial direction is at least approximately 0.4 mm, preferably at least approximately 0.5 mm, for example approximately 0.6 mm.

It can also be provided that a sealing lip thickness at a narrowest point on an inner side of a sealing edge which is an inner sealing edge in the axial direction is at most approximately 1.0 mm, preferably at most approximately 0.7 mm.

It can be favorable if a sealing lip thickness at a narrowest point between a sealing edge which is an inner sealing edge in the axial direction and a sealing edge which is an outer sealing edge in the axial direction is at least approximately 0.3 mm, preferably at least approximately 0.4 mm, for example approximately 0.5 mm.

It can also be provided that a sealing lip thickness at a narrowest point between a sealing edge which is an inner sealing edge in the axial direction and a sealing edge which is an outer sealing edge in the axial direction is at most approximately 0.9 mm, preferably at most approximately 0.6 mm.

It has been found that, in particular with the use of the preferred material, on account of the higher rigidity and strength, the described thicknesses can be sufficient for example to reliably seal the pressures of a fuel pump prevailing during operation. In addition, the described thicknesses can be necessary to be able to demold the sealing element without causing any damage.

A sealing lip angle is preferably an angle which is enclosed on the one hand by a surface or upper side of a sealing lip facing away from at least one sealing edge and on the other hand by the axis of symmetry.

In a completed state of the main body, in which this is ready in particular to receive and/or fix one or more, in particular two, spring elements, a sealing lip angle of one or both sealing lips is for example at least approximately 2°, preferably at least approximately 3°, in particular approximately 5°.

In a completed state of the main body, in which this is ready in particular to receive and/or fix one or more, in particular two, spring elements, a sealing lip angle of one or both sealing lips is for example at most approximately 12°, preferably at most approximately 10°, in particular approximately 8°.

The completed state of the main body, in which this is ready in particular to receive and/or fix one or more, in particular two, spring elements, is followed, preferably once the one or more, in particular two, spring elements has/have been received and/or fixed, by an assembly-ready state of the sealing element, in which the sealing element is completed and is prepared for installation in a device.

In the assembly-ready state of the sealing element, a sealing lip angle is greater than in the completed state of the main body, preferably by at least approximately 1°, for example at least approximately 2°, in particular approximately 3°, in particular on account of the effect of the spring element.

In the assembly-ready state of the sealing element, a sealing lip angle is greater than in the completed state of the main body, preferably by at most approximately 10°, for example at most approximately 6°, in particular approximately 3°, in particular on account of the effect of the spring element.

A reduction of the sealing lip angle reduces the radial force during demolding, since a smaller undercut between shaping device and sealing element is achieved by the straightening of the sealing lip. If the angle is changed to 0° (inner contour of the sealing lip parallel to the axis; the surface or upper side of a sealing lip facing away from the at least one sealing edge is parallel to the axis of symmetry), the overlap of the sealing element with the movable component is thus smaller, as is the radial force with the same spring element.

If the main body for example in a first step, in particular in an injection molding step, obtains a first shape, with which the sealing lip angle is approximately 3° or less, it can be necessary to subject the main body to a finishing operation.

A post-treatment of the sealing lip (also referred to as calibration of the sealing lip) can be necessary, for example after the injection molding step, in particular in order to achieve a necessary overlap and/or pressing effect of the sealing lips or sealing edges with or against the movable component.

Such a post-treatment can be carried out cold or also preferably at an increased temperature, in particular so as to counteract a shape-memory effect for example with the use of fluoropolymers.

In particular with the use of the sealing element as a fuel pump seal, the sealing lips preferably each have two or more sealing edges.

Recesses which are intended to promote the lubrication of the sealing element are preferably formed between the sealing edges.

These recesses thus serve preferably as lubrication stores and should be able to receive sufficient volumes so as to be able to maintain the lubrication and/or so as to be able to momentarily store a certain amount of fuel or engine oil in the event of temporarily higher leaks.

Deep recesses offer a larger storage space, but can also hinder demolding if the sealing element for example is produced in an injection molding process.

In particular, deep recesses can lead to severe plastic deformation of the sealing edges during demolding.

The depth of a recess is preferably a height difference between a sealing edge and a recess adjoining this sealing edge in a manner directed inwardly in the axial direction.

Here, the height difference is in particular a spacing along a direction running at right angles to an upper side or surface of the sealing lip facing away from the at least one sealing edge.

It can be advantageous if a height difference between a sealing edge and a recess adjoining this sealing edge in a manner directed inwardly in the axial direction is at least approximately 0.1 mm, preferably at least approximately 0.15 mm, for example at least approximately 0.2 mm.

It can also be favorable if a height difference between a sealing edge and a recess adjoining this sealing edge in a manner directed inwardly in the axial direction is at most approximately 0.4 mm, preferably at most approximately 0.3 mm, for example at most approximately 0.25 mm.

The height difference can also be referred to as a storage depth.

All of the described features and advantages of a sealing lip or sealing edge can relate both to the sealing lip(s) and/or the sealing edge(s) of the static sealing portion and to the sealing lip(s) and/or the sealing edge(s) of the dynamic sealing portion.

The sealing lips of the static sealing portion are preferably formed mirror-symmetrically to one another with respect to a transverse central plane running at right angles to the axis of symmetry.

The sealing lips of the dynamic sealing portion are preferably formed mirror-symmetrically to one another with respect to a transverse central plane running at right angles to the axis of symmetry.

The sealing lips of the dynamic sealing portions act preferably in directions opposite one another.

All sealing edges of both sealing lips of the dynamic sealing portions protrude and/or act preferably in a manner directed inwardly in the radial direction.

The sealing element is in particular a double-acting sealing element.

The thermoplastic material preferably is producible or is produced as follows:

It can be favorable if the thermoplastic material is a compound material which in particular is producible or is produced by means of a compounding facility.

The compounding facility preferably comprises an extruder, in particular a screw extruder, for example a twin-screw extruder.

In particular the screw speed, screw geometry, mixing ratio of the starting materials, and a temperature profile must be accurately controlled by means of open-loop and/or closed-loop control in order to ensure the desired material parameters.

In order to produce the thermoplastic material, one or more of the following processing conditions, in particular all of the following processing conditions, are preferably observed:

| Parameter | Unit | Value |
|---|---|---|
| Raw material 1—Fluoropolymer | % | 94 |
| Raw material 2—Carbon fiber | % | 4 |
| Raw material 3—Graphite | % | 2 |
| Screw diameter | mm | 25 |
| Ratio of length to diameter | — | 42 |
| Temperatures in the successive zones of the plasticizing unit: | | |
| C1 | ° C. | 80 ± 20 |
| C2 | ° C. | 340 ± 20 |
| C3 | ° C. | 360 ± 20 |
| C4 | ° C. | 365 ± 20 |
| C5 | ° C. | 350 ± 20 |
| C6 | ° C. | 340 ± 20 |
| Screw speed | rpm | 180 ± 40 |
| Mass pressure | bar | 12 ± 6 |
| Mass temperature (Temperature at the exit of the extruder) | ° C. | 360 ± 20 |
| Mass throughput | kg/h | 15 ± 5 |
| Extraction speed | m/min | 15 ± 5 |

It can be favorable if a fluoropolymer content of the thermoplastic material, in respect of its mass and/or its volume, is at least approximately 85%, preferably at least approximately 90%, for example approximately 94%.

It can also be provided that a fluoropolymer content of the thermoplastic material, in respect of its mass and/or its volume, is at most approximately 99%, preferably at most approximately 96%, for example approximately 94%.

It can be favorable if a carbon fiber content of the thermoplastic material, in respect of its mass and/or its volume, is at least approximately 0.5%, preferably at least approximately 2%, for example approximately 4%.

It can also be provided that a carbon fiber content of the thermoplastic material, in respect of its mass and/or its volume, is at most approximately 10%, preferably at most approximately 6%, for example approximately 4%.

It can be favorable if a graphite content of the thermoplastic material, in respect of its mass and/or its volume, is at least approximately 0.5%, preferably at least approximately 1.5%, for example approximately 2%.

It can also be provided that a graphite content of the thermoplastic material, in respect of its mass and/or its volume, is at most approximately 6%, preferably at most approximately 4%, for example approximately 2%.

The thermoplastic material obtained in the described way is preferably used to produce one or more sealing elements.

The thermoplastic material is for this purpose further processed, in particular is brought into a desired shape in an injection molding process, whilst retaining one or more of the following processing conditions, in particular all of the following processing conditions:

| Parameter | Unit | Value |
|---|---|---|
| Material name | — | VM3050 |
| Screw diameter | mm | 25 |
| Temperatures in the successive zones of the plasticizing unit: | | |
| C1 | ° C. | 350 ± 20 |
| C2 | ° C. | 365 ± 20 |
| C3 | ° C. | 370 ± 20 |
| C4 | ° C. | 375 ± 20 |
| C5 | ° C. | 380 ± 20 |
| Mold temperature | ° C. | 245 ± 20 |
| Plasticizing volume | cm$^3$ | 15.6 |
| Injection rate | cm$^3$/s | 30 |
| Injection pressure | bar | 1200 ± 100 |
| Holding pressure | bar | 160 |
| Holding pressure time | s | 6 |
| Residual cooling time | s | 15 |

The prominent properties of this thermoplastic material, called VM3050 in the present case, when used for the production of sealing elements are detailed in the table below in comparison with other materials:

| Properties | Test item | PTFE compound | VM3050 | VM3044 | VM3006 |
|---|---|---|---|---|---|
| Processing | — | pressing, sintering | thermoplastic (for example injection molding) | thermoplastic (for example injection molding) | thermoplastic (for example injection molding) |
| Filler content | — | carbon fiber: 10% graphite: 5% | carbon fiber: 4% graphite: 2% | PI: 20% | PEEK: 30% carbon fiber: 10% graphite: 10% |
| Colour | — | black | black | yellow | black |
| Wear (bearing surface) | Seal | 0.32 mm | 0.41 mm | 0.69 mm | 0.47 mm |
| Leak | Seal | 4 mm$^3$/min | 0.9 mm$^3$/min | 150 mm$^3$/min | 500 mm$^3$/min |
| Radial force (original) | Seal without spring | 120 ± 10 N | 220 ± 10 N | 70 ± 10 N | 90 ± 10 N |
| Radial force after thermal conditioning | Seal without spring | 90 ± 10 N | 130 ± 10 N | 40 ± 10 N | 80 ± 10 N |
| Radial force (original) | Seal with spring | 190 ± 10 N | 250 ± 10 N | 125 ± 10 N | 130 ± 10 N |
| Radial force after thermal conditioning | Seal with spring | 155 ± 10 N | 170 ± 10 N | 100 ± 10 N | 125 ± 10 N |

The terms "approximately" or "roughly" preferably denote a maximum deviation of at most 10%, in particular at most 5%, for example at most 1%, of the specified value.

Further preferred features and/or advantages of the invention are the subject of the following description and the representation in the drawings of exemplary embodiments.

In all Figures, like or functionally equivalent elements are provided with the same reference signs.

DETAILED DESCRIPTION OF THE DRAWINGS

Figure 1:
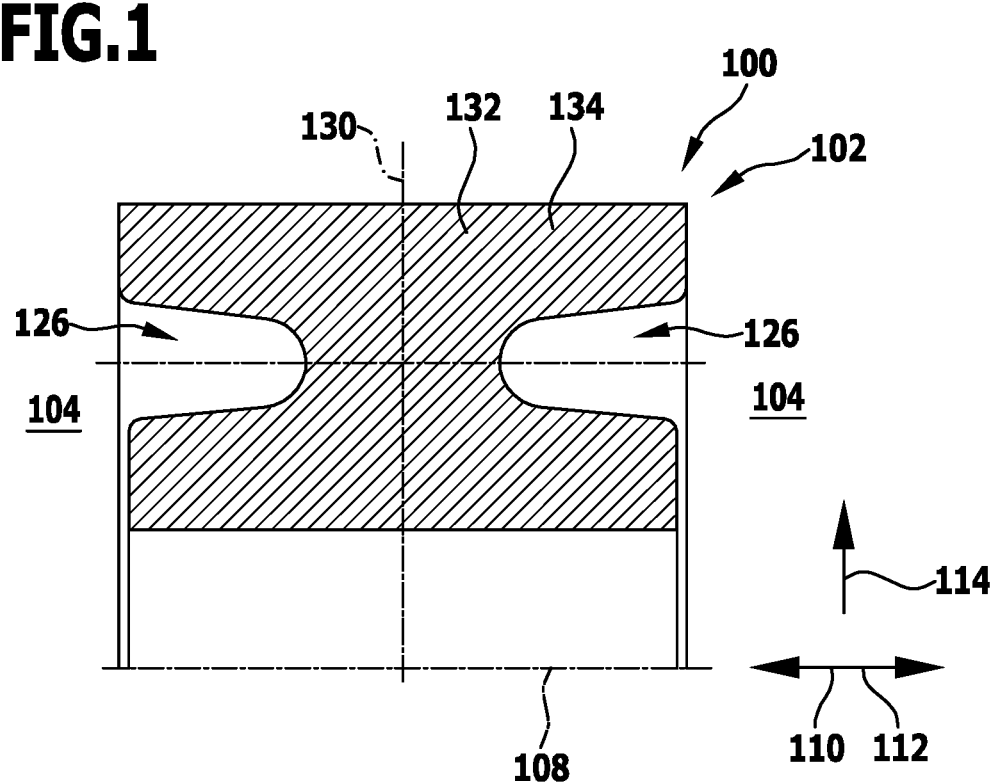
FIG. 1 shows a schematic longitudinal section through a main body of a sealing element, wherein the main body has its final outer shape only in part.
Figure 2:
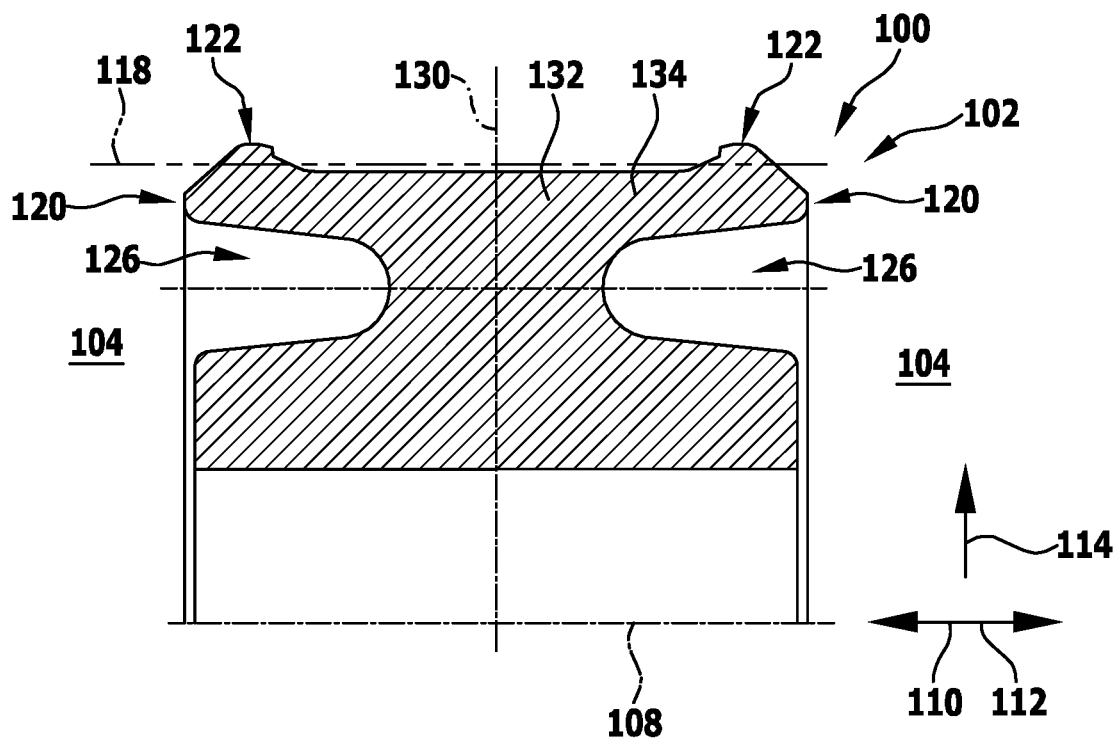
FIG. 2 shows a schematic illustration, corresponding to FIG. 1, of the main body, wherein the main body has been processed to complete an outer contour.
Figure 3:
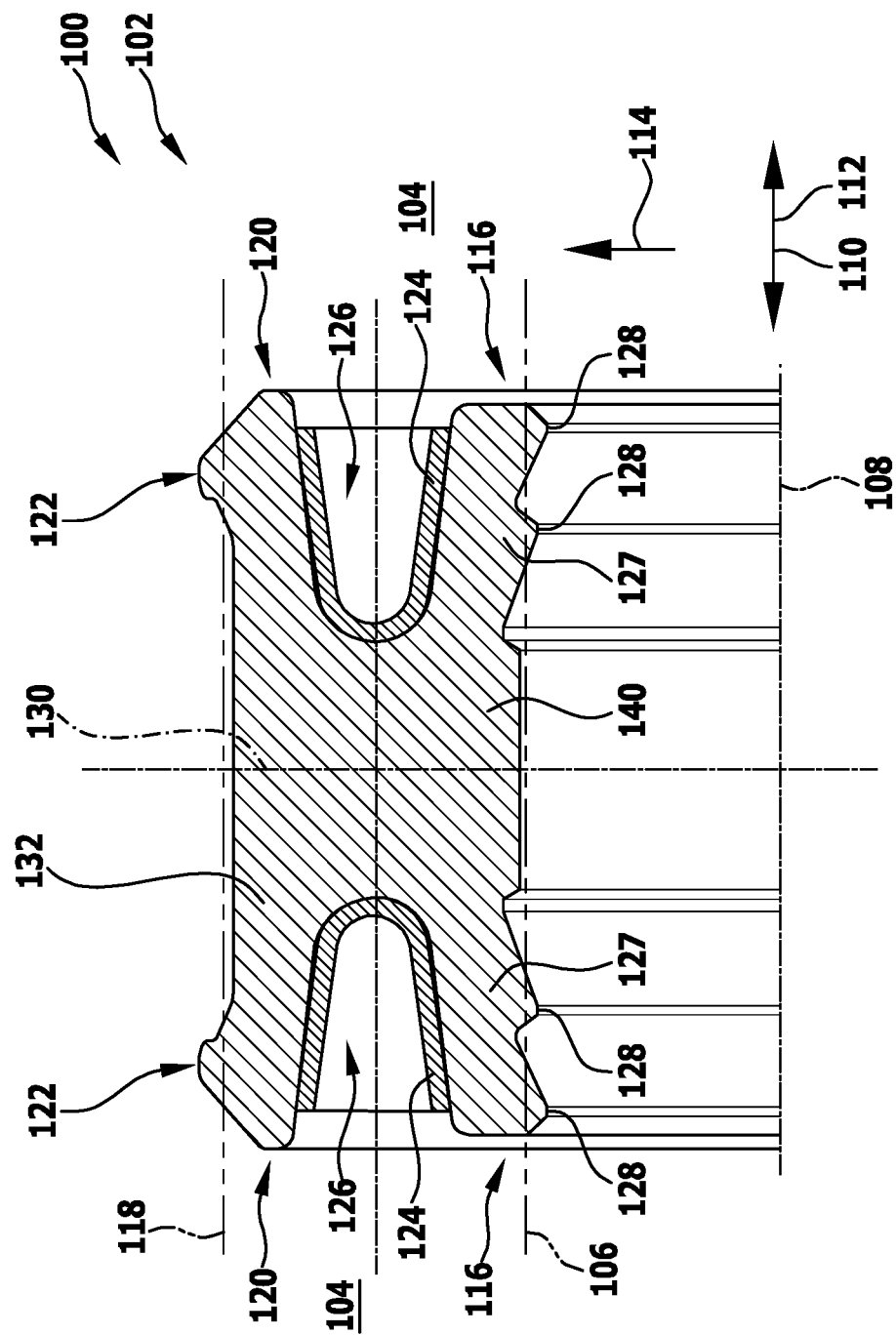
FIG. 3 shows a schematic illustration, corresponding to FIG. 1, of a sealing element which comprises the completed main body and two spring elements.

An embodiment illustrated in FIGS. 1 to 3 of a sealing element denoted as a whole by 100 is, for example, part of a high-pressure pump 102 and serves to provide a seal between two media spaces 104 in the region of a movable component 106.

The movable component 106 can be a piston of the high-pressure pump 102, for example.

The movable component 106 is in particular guided through the sealing element 100.

Here, both the movable component 106 and the sealing element 100 are preferably rotationally symmetrical about an axis of symmetry 108.

The axis of symmetry 108 is in particular oriented parallel to a longitudinal axis 110 of the movable component 106 and of the sealing element 100.

The sealing element 100 and the movable component 106 have a common axis of symmetry 108 in the assembled state.

The longitudinal axis 110 preferably defines an axial direction 112.

A direction oriented at right angles to the axial direction 112 is a radial direction 114.

The media spaces 104 are preferably separated from one another in the axial direction 112 by means of the sealing element 100.

The sealing element 100 preferably borders the movable component 106 in the radial direction 114 in an inwardly directed manner by means of two dynamic sealing portions 116.

The sealing element 100 borders a housing 118 of the high-pressure pump 102 in an outwardly directed manner in the radial direction 114.

The sealing element 100, in the assembled state, is fixed relative to the housing 118.

Two sealing regions 120 of the sealing element 100 associated with the two media spaces 104 thus comprise, in addition to the dynamic sealing portions 116, also two static sealing portions 122 bearing against the housing 118.

The dynamic sealing portions 116 serve to provide the dynamic seal between the sealing element 100 and the component 106 moving relative to the sealing element 100, in particular displaceable along the axial direction 112.

In order to attain an increased sealing effect, one or more spring elements 124 of the sealing element 100 can be provided.

The one or more spring elements 124 in particular are arrangeable or arranged in one or more spring element receptacles 126.

In particular, one or more dynamic sealing portions 116 are pressable against the movable component 106 by means of the one or more spring elements 124.

Alternatively or additionally hereto, it can be provided that one or more static sealing portions 122 are pressable against a housing 118 of the high-pressure pump 102 by means of the one or more spring elements 124.

A spring element 124 is in particular annular, for example circular ring-shaped, and for example has a V-shaped or U-shaped cross-section.

Each dynamic sealing portion 116 preferably comprises a sealing lip 127 having one, two or more than two sealing edges 128.

Each sealing lip 127 and/or each sealing edge 128 is preferably substantially annular and substantially rotationally symmetrical about the axis of symmetry 108.

The sealing edges 128 of each sealing lip 127 are arranged here preferably at different spacings from a transverse central plane 130 of the sealing element 100 running at right angles to the longitudinal axis 110 of the sealing element 100.

The sealing element 100 in particular comprises a main body 132, which is formed preferably in one piece from a thermoplastic material.

The main body 132 in particular comprises one or more dynamic sealing portions 116, one or more static sealing portions 122, and one or more spring element receptacles 126.

The main body 132 by way of example can be produced as follows.

By way of example, a blank 134 of the main body 132 can be produced in an injection molding process.

The blank 134 of the main body 132 at this point has its final outer shape only in portions.

In particular, merely the spring element receptacles 126 are completed at the time of production of the blank 134.

By contrast, the sealing portions 116, 122 must be subjected to finishing in order to complete the main body 132, in particular by machining, for example CNC processing.

As is clear in particular from a comparison of FIGS. 1 to 3, an outer contour can first be processed by way of example, in order to complete the radially outer static sealing portions 122. A radially inner processing can then be performed in order to complete the dynamic sealing portions 116.

Alternatively, it can be provided that the blank 134 is produced for example in an injection molding method in such a way that both the static sealing portions 122 and the spring element receptacles 126 already have the final outer shape after the execution of the injection molding process.

Merely the radially inner region then still has to be subjected to a mechanical finishing operation in order to complete the dynamic sealing portions 116.

In particular, the main body 132 and thus the entire sealing element 100 can be produced particularly efficiently and economically by a combination of production of the blank 134 in a high-pressure process and/or a high-temperature process, for example an injection molding process, on the one hand and only partial subsequent processing in order to complete the main body 132 on the other hand.

Figure 4:
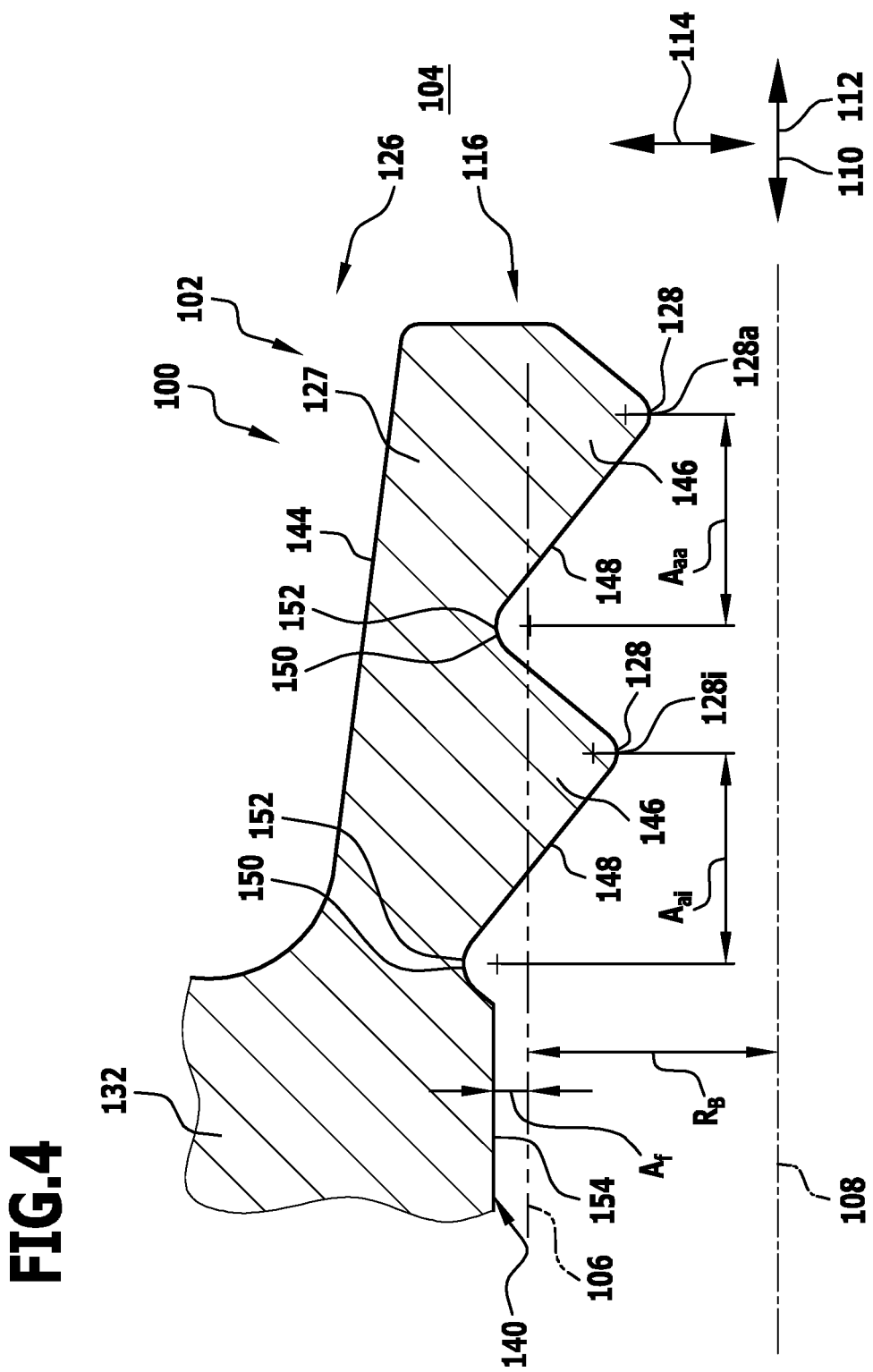
FIG. 4 shows a schematic longitudinal section through a sealing lip of a sealing element, in which a middle portion is provided with a guide portion.

FIG. 4 shows an enlarged sectional illustration of a sealing lip 127 of a dynamic sealing portion 116 of an alternative embodiment of a sealing element 100.

The sealing lip 127 of this sealing element 100 differs from the sealing lip 127 of the embodiment of the sealing element 100 illustrated in FIG. 3 fundamentally by its geometry.

In order to explain the geometry of the sealing lip 127 in greater detail, the individual components and region of the sealing lip 127 will first be explained in greater detail:

The sealing lip 127 is formed by a portion of the main body 132 running at a slight incline relative to the axial direction 112 from a middle portion 140 of the main body 132 and protruding slightly inwardly in the radial direction 114. Here, the sealing lip 127 comprises an underside 142 facing towards the movable component 116 in the assembled state of the sealing element 100 and also an upper side 144 facing away from the movable component 106 in the assembled state of the sealing element 100.

The upper side 144 is substantially flat in cross-section. When the sealing element 100 is observed three-dimensionally, the upper side 144 in particular has a lateral shape in the form of a truncated cone.

One or more, for example two, protrusions 146 is/are provided on the underside 142 of the sealing lip 127.

These protrusions 146 form the sealing edges 128 of the sealing lip 127 at their ends protruding inwardly in the radial direction 114.

The sealing edges 128 are each adjoined by a flank 148 directed inwardly in the axial direction 112, that is to say in the direction of the middle portion 140 of the main body 132.

A recess 150 or indentation 152 of the sealing lip 127 is provided on a side of each flank 148 facing away from the corresponding sealing edge 128.

In particular, a recess 150 is thus provided between the two protrusions 146 forming the sealing edge 128.

A further recess 150 is preferably formed between the sealing edge 128*i*, which is an inner sealing edge in the axial direction, and the middle portion 140 of the main body 132.

As can be derived from FIG. 4, the middle portion 140 of the main body 132 can comprise a guide portion 154. This guide portion 154 preferably has a surface running parallel to the axis of symmetry 108 and serves to support and/or guide the movable component 106 in the case of a sideward movement of the movable component 106 in the state of use of the sealing element 100.

A spacing of the guide portion 154 from the axis of symmetry 108 is preferably greater here than a radius $R_B$ of the movable component 106.

The outer sealing edge 128*a* of the sealing lip 127 forms a primary sealing edge 128.

The inner sealing edge 128*i* of the sealing lip 127 forms a secondary sealing edge 128.

As can be derived from FIG. 4, the outer sealing edge 128*a* and the recess 150 adjoining this outer sealing edge 128*a* in a manner directed inwardly in the axial direction 112 have an axial spacing $A_{aa}$ from one another, which for example corresponds at least roughly to an axial spacing $A_{ai}$ between the inner sealing edge 128*i* and the recess 150 adjoining this inner sealing edge 128*i* in a manner directed inwardly in the axial direction 112.

The spacing $A_{aa}$ is preferably between approximately 0.5 mm to approximately 2.5 mm, for example between approximately 0.5 mm to approximately 1.5 mm, in particular between approximately 0.6 mm to approximately 1 mm.

Both the spacing $A_{aa}$ and the spacing $A_{ai}$ are preferably based on the spacing of the relevant parts of the sealing lip 127 from one another in the axial direction 112.

By suitable selection of the spacings $A_{aa}$ and $A_{ai}$, the sealing element 100 can be removed with minimal damage from a molding device (not illustrated), for example in the case of production of said sealing element in an injection molding method. In particular, the sealing lip 127 can be bent outwardly in the radial direction 114 in the region of the outer sealing edge 128*a* during the demolding process so as to also enable a demolding of the protrusion 146 forming the inner sealing edge 128*i* with minimal destruction.

During the demolding, the outer sealing edge 128*a* and the inner sealing edge 128*i* are preferably moved outwardly in the radial direction 114 substantially evenly. The forces acting as a result on the sealing lip 127 can then preferably be transferred and taken up evenly.

Figure 5:
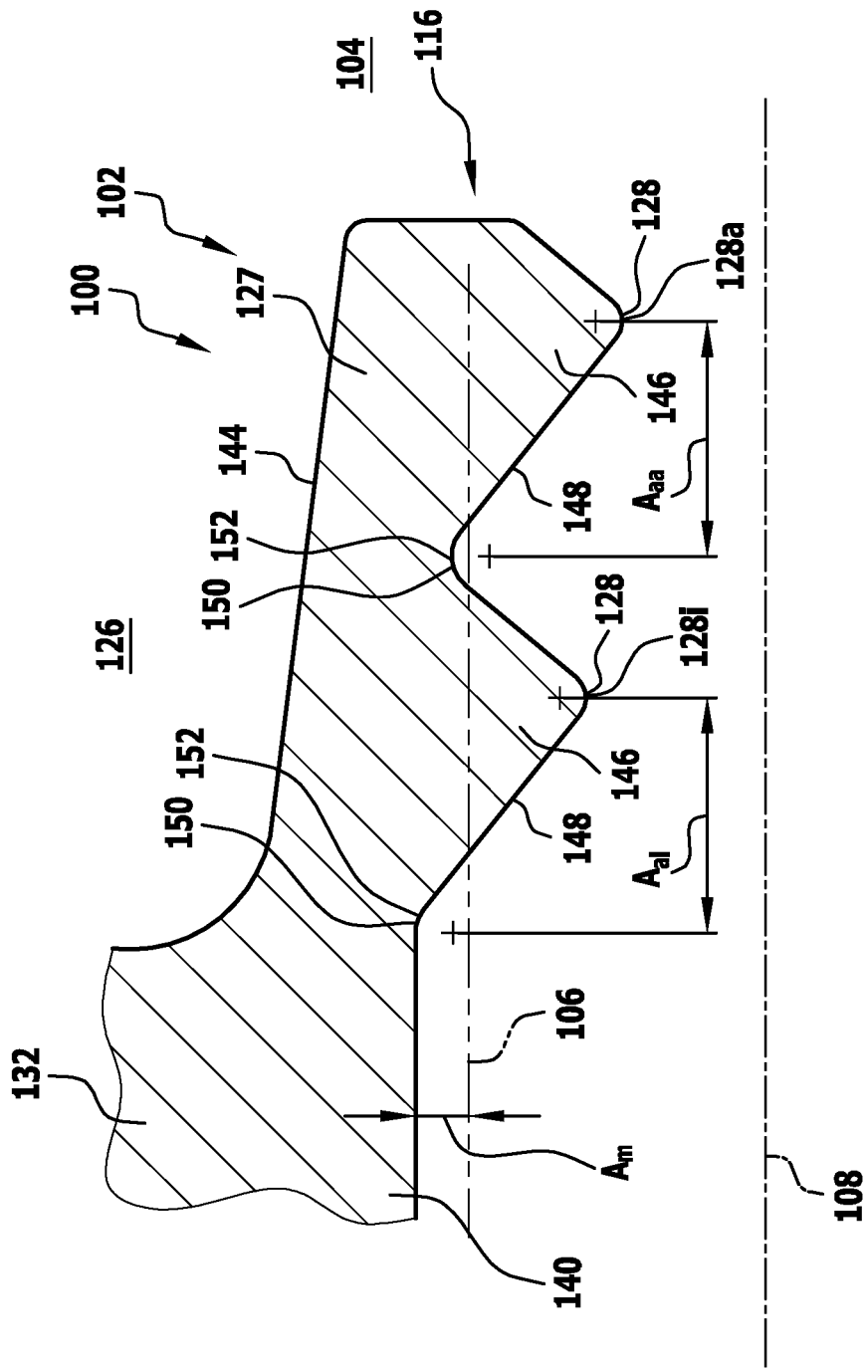
FIG. 5 shows an illustration, corresponding to FIG. 4, of a sealing lip of a sealing element, wherein the sealing element does not comprise a guide portion.

An alternative embodiment of a sealing lip 127 of a sealing element 100 illustrated in FIG. 5 differs from the embodiment illustrated in FIG. 4 fundamentally in that the middle portion 140 does not have a guide portion 154.

A spacing $A_m$ between the middle portion 140 and the movable component 106 in the assembled state of the sealing element 100 is consequently greater than in the embodiment of the sealing element 100 illustrated in FIG. 4.

For the rest, the embodiment illustrated in FIG. 5 coincides in terms of structure and function with the embodiment illustrated in FIG. 4, and therefore reference is made to the above description of FIG. 4 in this regard.

Figure 6:
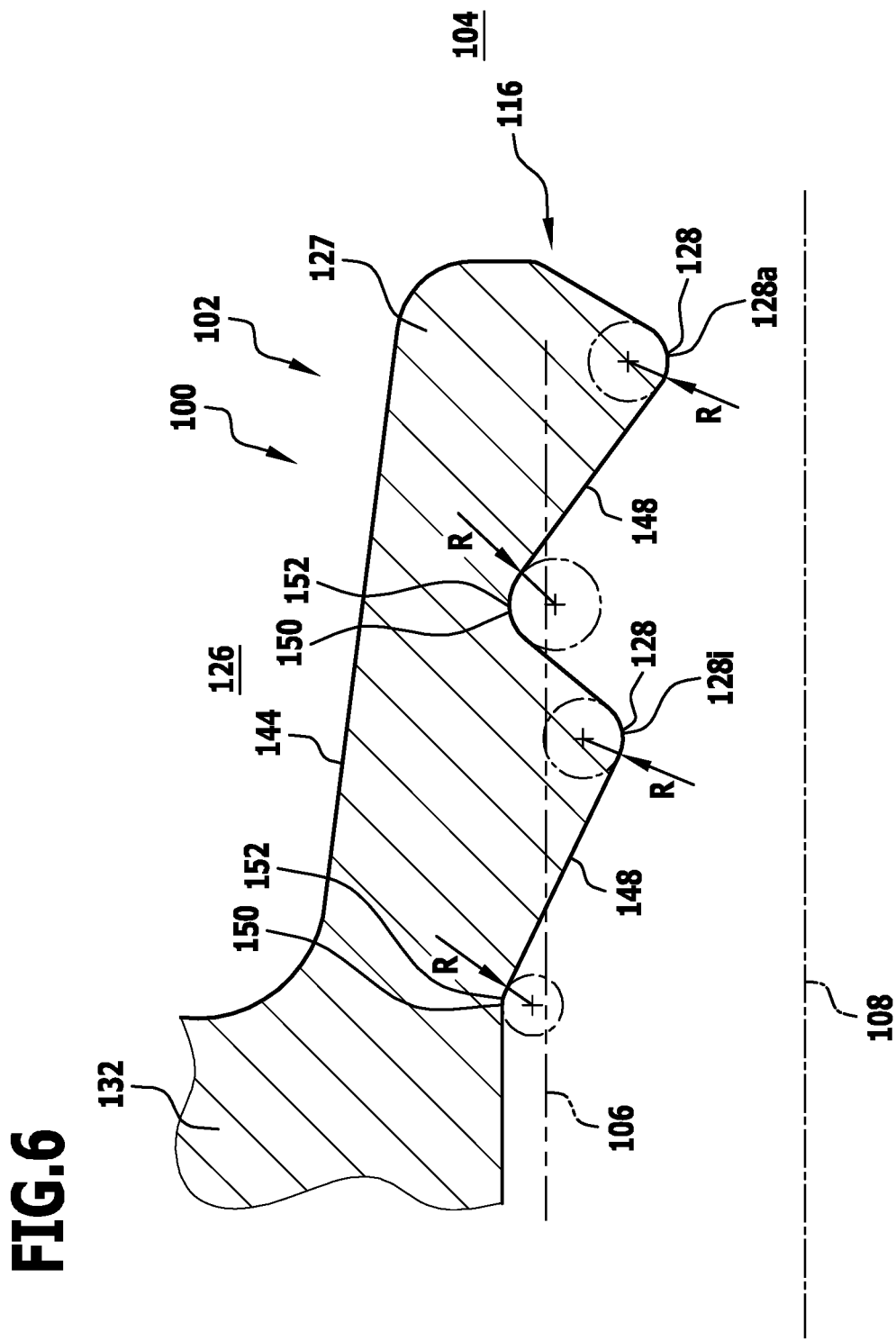
FIG. 6 shows an illustration, corresponding to FIG. 4, of a sealing lip in order to illustrate radii of the sealing edges of the sealing lip and also radii of recesses in the sealing lip.

In FIG. 6 radii R of the sealing edges 128 and of the recesses 150 are illustrated. The selection of the suitable radii in particular influences a demolding of the sealing element 100 after production thereof in an injection molding method.

The radii R of the sealing edges 128 and of the recesses 150 are preferably selected to be at least roughly of similar size.

By way of example, the radii are between approximately 0.1 mm and approximately 0.5 mm, in particular approximately 0.2 mm.

However, radii R different from one another can also be provided.

By way of example, the radii R of the sealing edges 128 can be larger or smaller than the radii R of the recesses 150.

Figure 7:
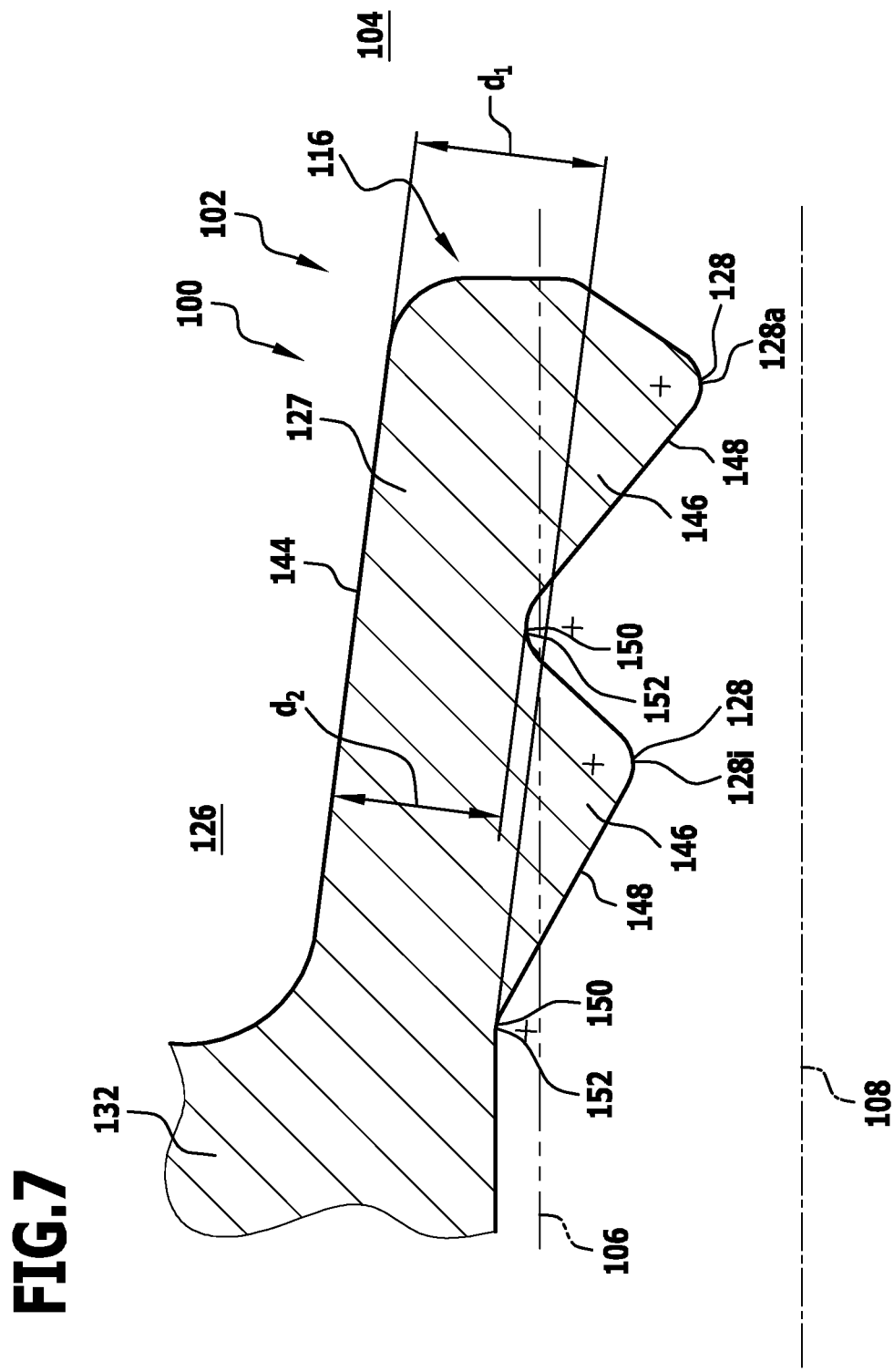
FIG. 7 shows an illustration, corresponding to FIG. 4, of a sealing lip in order to illustrate a sealing lip thickness.

As can be derived in particular from FIG. 7, the sealing lip 127 is preferably formed so that a sealing lip thickness $D_1$ in the region of the recess 150 or indentation 152 between the middle portion 140 and the flank 148 of the inner sealing edge 128*i* is greater than a sealing lip thickness $D_2$ between the two sealing edges 128*i*, 128*a* in the region of the recess 150 or indentation 152 arranged therebetween.

The sealing lip thickness $D_1$, $D_2$ is in each case a minimum spacing between the upper side 144 of the sealing lip 127 and the corresponding recess 150 or indentation 152.

It can be provided that the sealing lip thickness $D_1$ by way of example is between approximately 0.4 mm to approximately 1 mm, in particular between approximately 0.5 mm to approximately 0.7 mm, preferably approximately 0.6 mm.

It can also be provided that the sealing lip thickness $D_2$ is between approximately 0.3 mm to approximately 0.7 mm, in particular is approximately 0.5 mm.

The sealing lip 127 is in particular formed here so that an optimal seal at the movable component 106 is ensured if this movable component 106 by way of example has a radius $R_B$ between approximately 2 mm to 9 mm, in particular approximately 2.5 mm to approximately 6.5 mm.

Figure 8:
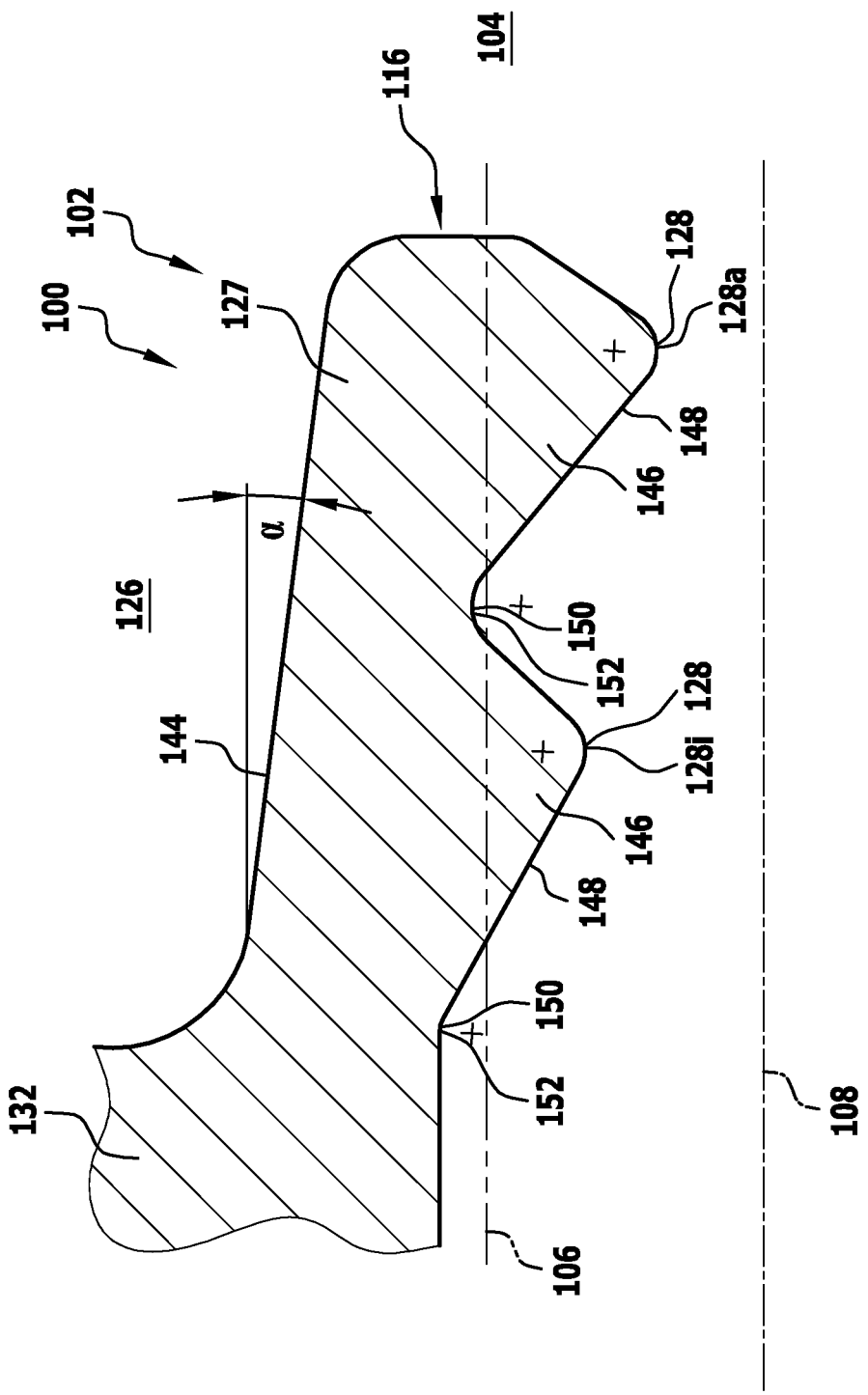
FIG. 8 shows an illustration, corresponding to FIG. 4, of a sealing lip in order to illustrate a sealing lip angle.

As can be derived in particular from FIG. 8, the sealing lip 127 protrudes away from the middle portion 140 of the main body 132 of the sealing element 100 at an incline relative to the axial direction 112 and at an incline relative to the radial direction 114.

A sealing lip angle α, which is enclosed on the one hand by the upper side 144 of the sealing lip 127 and on the other hand by the axis of symmetry 108, in the completed state of the main body 132 prior to the assembly of a spring element 124 is preferably between approximately 3° and approximately 10°. In a state of the sealing element 100 ready for assembly, i.e. following the assembly of the spring elements 124, the sealing lip angle α can be greater, for example by approximately 1° to 3°.

It can be provided that the sealing lip angle α during production of the main body 132 is initially selected to be smaller. By way of example, when producing the main body 132 in an injection molding method, a sealing lip angle α of 0° can be provided initially. The upper side 144 of the sealing lip 127 then runs substantially parallel to the axis of symmetry 108.

In order to ensure an optimal sealing effect of the sealing element 100, a finishing operation or post-treatment of the main body 132 is then preferably performed after the production of the main body 132 in the injection molding method.

In particular, it can be provided here that the sealing lip 127 is reshaped by cold deformation or deformation after or during a heating of the sealing lip 127 and/or of the entire main body 132, in particular so as to obtain a sealing lip angle α of more than approximately 3°.

Figure 9:
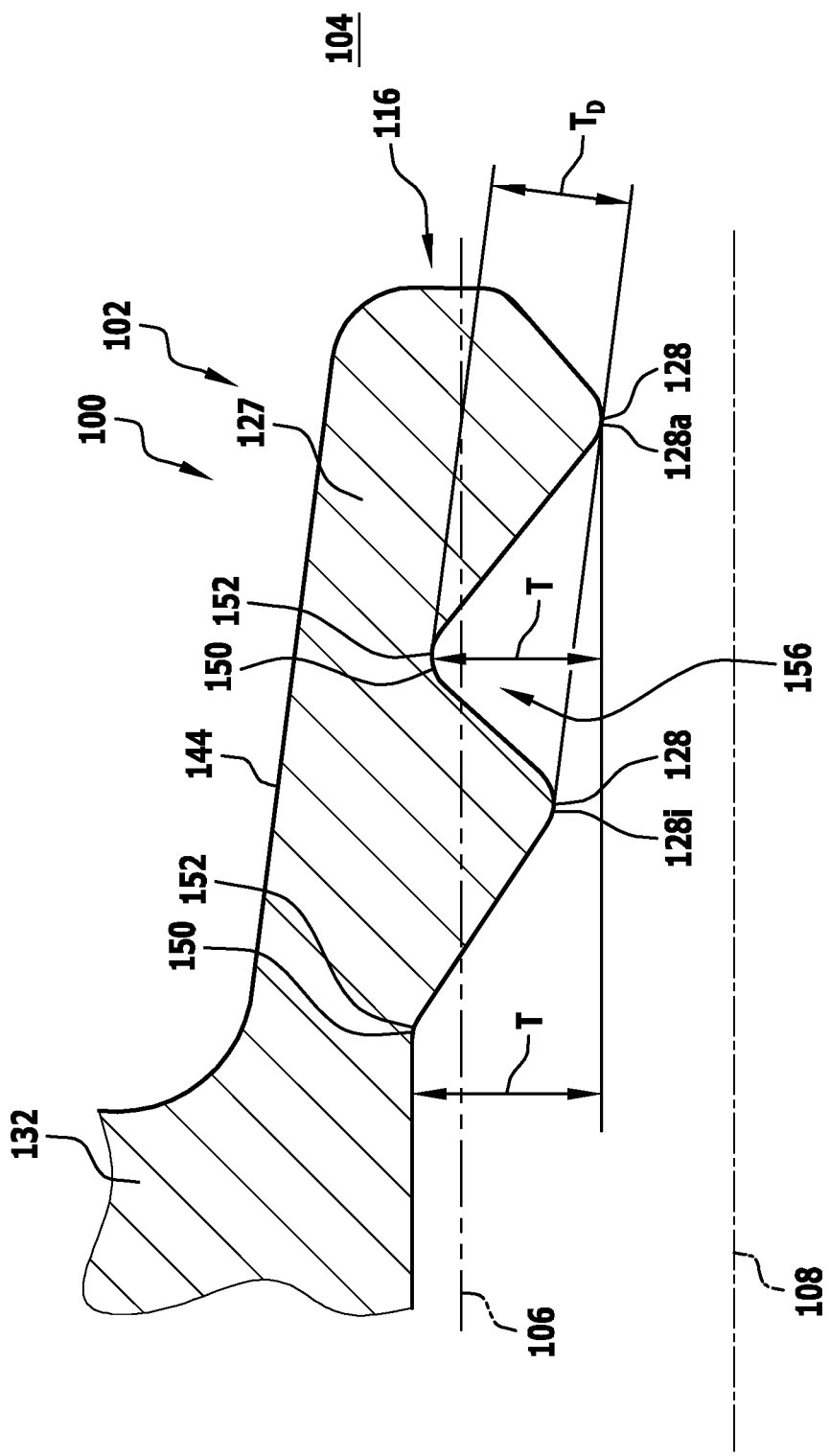
FIG. 9 shows an illustration, corresponding to FIG. 4, of a sealing lip in order to illustrate undercut depths and a storage depth of a store of the sealing lip.

In FIG. 9 undercut depths T are illustrated, which, on account of the geometry of the sealing lip 127, have to be overcome when demolding the sealing element 100. An undercut depth T between the two sealing edges 128 is here preferably smaller than an undercut depth T in the region of the middle portion 140 of the main body 132 and/or than in the region of a recess 150 and/or indentation 152 arranged between the middle portion 140 and the flank 148 of the inner sealing edge 128i.

Due to the fact that the undercut depths T have to be overcome, the de-molding of the sealing element 100 from an injection mold is in particular a forced demolding.

As can also be derived from FIG. 9, the sealing lip 127 preferably has a store 156 for receiving a medium, for example fuel or engine oil. By means of the store 156, in particular a leak of the sealing element in the region of the sealing lip 127 can be compensated for at least temporarily in that the medium guided past the outer sealing edge 128a is received in the store 156. By suitable geometry of the sealing edges 128 and/or the flanks 148, the received medium can be recovered into the adjacent media space 104 little by little, in particular with an axial movement of the movable component 106.

A storage depth $T_D$ is preferably a minimal spacing between the recess 150 between the two sealing edges 128 and a straight line running through the two sealing edges 128.

The storage depth $T_D$ is preferably between approximately 0.1 mm to approximately 0.4 mm, in particular between approximately 0.15 mm and approximately 0.25 mm.

The parameters of a sealing lip 127 described with regard to FIGS. 4 to 9 preferably apply to a sealing lip 127 of a dynamic sealing portion 116 of the sealing element 100. It can also be provided that the described values and parameters apply for both sealing lips 127 of both dynamic sealing portions 116.

In particular, it can be provided that the sealing element 100 in all described embodiments is mirror-symmetrical with respect to the transverse central plane 130.

The sealing element 100 is preferably also rotationally symmetrical about the axis of symmetry 108 in each described embodiment.

Preferred embodiments can be the following:

1. Sealing element (100) for providing a seal between a first media space (104) filled with a first medium and a second media space (104) filled with a second medium in the region of a movable component (106), which is guided or guidable through the sealing element (100) displaceably along a longitudinal axis (110) of the movable component (106) and/or rotatably along the longitudinal axis (110), wherein the sealing element (100) comprises a main body (132), which has two dynamic sealing portions (116) which abut or are abuttable against the movable component (106), wherein each dynamic sealing portion (116) has a sealing lip (127), wherein each sealing lip (127) comprises one, two or more sealing edges (128), wherein the main body (132) is preferably formed from a partially fluorinated or fully fluorinated thermoplastic material and has obtained at least part of its final outer shape or only part of its final outer shape in particular in a high-pressure process and/or in a high-temperature process.

2. Sealing element (100) according to embodiment 1, characterized in that the main body (132) is an injection-molded component and/or is formed from an injection-moldable partially fluorinated or fully fluorinated thermoplastic material.

3. Sealing element (100) according to either one of embodiments 1 or 2, characterized in that a spacing (A) between a sealing edge (128) which is an outer sealing edge in the axial direction (112) and a recess adjoining this sealing edge (128) in a manner directed inwardly in the axial direction (112) is at least approximately 0.5 mm, preferably at least approximately 0.6 mm.

4. Sealing element (100) according to any one of embodiments 1 to 3, characterized in that a spacing (A) between a sealing edge (128) which is an outer sealing edge in the axial direction (112) and a recess (150) adjoining this sealing edge (128) in a manner directed inwardly in the axial direction (112) is at most approximately 1.5 mm, preferably at most approximately 1.0 mm, in particular at most approximately 0.9 mm, for example approximately 0.8 mm.

5. Sealing element (100) according to any one of embodiments 1 to 4, characterized in that a spacing (A) between a sealing edge (128) which is an inner sealing edge in the axial direction (112) and a recess (150) adjoining this sealing edge (128) in a manner directed inwardly in the axial direction (112) is at least approximately 0.5 mm, preferably at least approximately 0.6 mm.

6. Sealing element (100) according to any one of embodiments 1 to 5, characterized in that a spacing (A) between a sealing edge (128) which is an inner sealing edge in the axial direction (112) and a recess (150) adjoining this sealing edge (128) in a manner directed inwardly in the axial direction (112) is at most approximately 2.5 mm, preferably at most approximately 1.0 mm, in particular at most approximately 0.9 mm, for example approximately 0.8 mm.

7. Sealing element (100) according to any one of embodiments 1 to 6, characterized in that two flank lengths of adjacent sealing edges (128) of a sealing lip (127) or all sealing lips (127) differ from one another by at most approximately 15%, preferably at most approximately 5%.

8. Sealing element (100) according to any one of embodiments 1 to 7, characterized in that a flank length of a sealing edge (128) which is an inner sealing edge in the axial direction (112) is smaller than a flank length of a sealing edge (128) which is an outer sealing edge in the axial direction (112), for example by at least approximately 0.05 mm, in particular at least approximately 0.1 mm, and/or by at most approximately 0.2 mm, in particular at most approximately 0.15 mm.

9. Sealing element (100) according to any one of embodiments 1 to 8, characterized in that a flank length of a sealing edge (128) which is an outer sealing edge in the axial direction (112) is smaller than a flank length of a sealing edge (128) which is an inner sealing edge in the axial direction (112), for example by at least approximately 0.05 mm, in particular at least approximately 0.1 mm, and/or by at most approximately 0.2 mm, in particular at most approximately 0.15 mm.

10. Sealing element (100) according to any one of embodiments 1 to 9, characterized in that a sealing edge angle which is enclosed on the one hand by a flank (148) of the sealing edge (128) adjoining a sealing edge (128) in a manner directed inwardly in the axial direction (112) and on the other hand by an axis of symmetry (108) of the sealing element (100), is at least roughly of equal size preferably for each sealing edge (128), wherein the sealing edge angles of adjacent sealing edges (128) of a sealing lip (127) or of all sealing lips (127) differ from one another preferably by at most approximately 15%, preferably at most approximately 5%.

11. Sealing element (100) according to any one of embodiments 1 to 10, characterized in that a diameter of the movable component (106) is preferably at least approximately 4 mm, for example at least approximately 5 mm, and/or at most approximately 18 mm, for example at most approximately 13 mm.

12. Sealing element (100) according to any one of embodiments 1 to 11, characterized in that a sealing edge radius of a sealing edge (128) which is an inner sealing edge in the axial direction (112) and/or a sealing edge radius of a sealing edge (128) which is an outer sealing edge in the axial direction (112) is at least approximately 0.1 mm, in particular at least approximately 0.15 mm, for example approximately 0.2 mm.

13. Sealing element (100) according to any one of embodiments 1 to 12, characterized in that a sealing edge radius of a sealing edge (128) which is an inner sealing edge in the axial direction (112) and/or a sealing edge radius of a sealing edge (128) which is an outer sealing edge in the axial direction (112) are/is at most approximately 0.5 mm, in particular at most approximately 0.25 mm.

14. Sealing element (100) according to any one of embodiments 1 to 13, characterized in that a sealing lip thickness (D) at a narrowest point on an inner side of a sealing edge (128) which is an inner sealing edge in the axial direction (112) is at least approximately 0.4 mm, preferably at least approximately 0.5 mm, for example approximately 0.6 mm.

15. Sealing element (100) according to any one of embodiments 1 to 14, characterized in that a sealing lip thickness (D) at a narrowest point on an inner side of a sealing edge (128) which is an inner sealing edge in the axial direction (112) is at most approximately 1.0 mm, preferably at most approximately 0.7 mm.

16. Sealing element (100) according to any one of embodiments 1 to 15, characterized in that a sealing lip thickness (D) at a narrowest point between a sealing edge (128) which is an inner sealing edge in the axial direction (112) and a sealing edge (128) which is an outer sealing edge in the axial direction (112) is at least approximately 0.3 mm, preferably at least approximately 0.4 mm, for example approximately 0.5 mm.

17. Sealing element (100) according to any one of embodiments 1 to 16, characterized in that a sealing lip thickness (D) at a narrowest point between a sealing edge (128) which is an inner sealing edge in the axial direction (112) and a sealing edge (128) which is an outer sealing edge in the axial direction (112) is at most approximately 0.9 mm, preferably at most approximately 0.6 mm.

18. Sealing element (112) according to any one of embodiments 1 to 17, characterized in that, in a completed state of the main body (132), a sealing lip angle of one or both sealing lips (127) is for example at least approximately 2°, preferably at least approximately 3°, in particular approximately 5°.

19. Sealing element (100) according to any one of embodiments 1 to 18, characterized in that, in a completed state of the main body (132), a sealing lip angle of one or both sealing lips (127) is for example at most approximately 12°, preferably at most approximately 10°, in particular approximately 8°.

20. Sealing element (100) according to any one of embodiments 1 to 19, characterized in that a height difference between a sealing edge (128) and a recess adjoining said sealing edge (128) in a manner directed inwardly in the axial direction (112) and/or a storage depth of the sealing lip (127) is at least approximately 0.1 mm, preferably at least approximately 0.15 mm, for example at least approximately 0.2 mm.

21. Sealing element (100) according to any one of embodiments 1 to 20, characterized in that a height difference between a sealing edge (128) and a recess adjoining said sealing edge (128) in a manner directed inwardly in the axial direction (112) and/or a storage depth of the sealing lip (127) is at most approximately 0.4 mm, preferably at most approximately 0.3 mm, for example at most approximately 0.25 mm.

22. Sealing element (100), in particular according to any one of embodiments 1 to 21, for providing a seal between a first media space (104) filled with a first medium and a second media space (104) filled with a second medium in the region of a movable component (106), which is guided or guidable through the sealing element (100) displaceably along a longitudinal axis (110) of the movable component (106) and/or rotatably along the longitudinal axis (110), wherein the sealing element (100) comprises a main body (132), which has two dynamic sealing portions (116) which abut or are abuttable against the movable component (106), wherein each dynamic sealing portion (116) has a sealing lip (127), wherein each sealing lip (127) comprises one, two or more sealing edges (128), wherein the main body (132) is formed of a partially fluorinated or fully fluorinated thermoplastic material which is injection-moldable.

23. Sealing element (100) according to any one of embodiments 1 to 23, characterized in that the main body (132) of the sealing element (100) has obtained at least part of its final outer shape or only part of its final outer shape or its entire final outer shape by means of turning and/or machining.

24. Sealing element (100) according to any one of embodiments 1 to 23, characterized in that an inner side or underside (142) of the main body (132) facing towards the movable component (106) in the mounted state of the sealing element (100) is subjected to a finishing operation after a shaping step.

25. Sealing element (100) according to any one of embodiments 1 to 24, characterized in that a fluoropolymer content of the thermoplastic material, in respect of its mass and/or its volume, is at least approximately 85%, preferably at least approximately 90%, for example approximately 94%.

26. Sealing element (100) according to any one of embodiments 1 to 25, characterized in that a fluoropolymer content of the thermoplastic material, in respect of its mass and/or its volume, is at most approximately 99%, preferably at most approximately 96%, for example approximately 94%.

27. Sealing element (100) according to any one of embodiments 1 to 26, characterized in that a carbon fiber content of the thermoplastic material, in respect of its mass and/or its volume, is at least approximately 0.5%, preferably at least approximately 2%, for example approximately 4%.

28. Sealing element (100) according to any one of embodiments 1 to 27, characterized in that a carbon fiber content of the thermoplastic material, in respect of its mass and/or its volume, is at most approximately 10%, preferably at most approximately 6%, for example approximately 4%.

29. Sealing element (100) according to any one of embodiments 1 to 28, characterized in that a graphite content of the thermoplastic material, in respect of its mass and/or its volume, is at least approximately 0.5%, preferably at least approximately 1.5%, for example approximately 2%.

30. Sealing element (100) according to any one of embodiments 1 to 29, characterized in that a graphite content of the thermoplastic material, in respect of its mass and/or its volume, is at most approximately 6%, preferably at most approximately 4%, for example approximately 2%.

31. High-pressure pump (102), comprising at least one sealing element (100) according to any one of embodiments 1 to 30.

32. Use of a high-pressure pump (102) according to embodiment 31 for injecting a fuel into an internal combustion engine.

33. Use of a sealing element (100) according to any one of embodiments 1 to 30 as a rod seal, piston seal and/or shaft seal, in particular in a fuel pump and/or a piston pump.

34. Use of a partially fluorinated or fully fluorinated plastics material, which is injection-moldable, for producing a sealing element (100), in particular a sealing element (100) according to any one of embodiments 1 to 30.

35. Method for producing a sealing element (100), in particular a sealing element (100) according to any one of embodiments 1 to 30, comprising:
producing a main body (132) of the sealing element (100) from a partially fluorinated or fully fluorinated thermoplastic material, wherein the main body (132) preferably obtains at least part of its final outer shape or only part of its final outer shape in particular in a high-pressure process and/or in a high-temperature process.

36. Method according to embodiment 35, characterized in that the high-pressure process is an embossing process, a press molding process, an injection molding process and/or a pressure diecasting process.

37. Method according to any one of embodiments 35 or 36, characterized in that the high-temperature process comprises a hot embossing process, a hot press molding process, an injection molding process, a casting process, a sintering process and/or a thermoforming process.

38. Method according to any one of claims 35 to 37, characterized in that the main body (132) of the sealing element (100) is subjected to a finishing operation only in part after the high-pressure process and/or the high-temperature process have/has been performed.

39. Method according to any one of embodiments 35 to 38, characterized in that the main body (132) is machined and/or coated fully or in part.

40. Method according to any one of embodiments 35 to 39, characterized in that one or more sealing portions (116, 122) of the sealing element (100), in particular sealing edges (128), is/are produced by mechanical processing, in particular machining, of the main body (132).

41. Method according to any one of embodiments 35 to 40, characterized in that the main body (132), in an injection molding step, obtains a first shape, with which a sealing lip angle of one or both sealing lips (127) of the dynamic sealing portion (116) is approximately 3° or less.

42. Method according to embodiment 41, characterized in that the main body (132) is subjected to a post-treatment, in particular a thermal and/or mechanical post-treatment, in such a way that the sealing lip angle of one or both sealing lips (127) of the dynamic sealing portion (116) is increased to more than approximately 3°, for example at least approximately 5°.

43. Method, in particular according to any one of embodiments 35 to 42, for producing a sealing element (100), in particular a sealing element (100) according to any one of embodiments 1 to 30, comprising:
producing a main body (132) of the sealing element (100) from a partially fluorinated or fully fluorinated thermoplastic material which is injection-moldable.

44. Method according to any one of embodiments 35 to 43, characterized in that the main body (132) of the sealing element (100) obtains at least part of its final outer shape or only part of its final outer shape or its entire final outer shape by means of turning and/or machining.

45. Method according to any one of embodiments 35 or 44, characterized in that an inner side or underside (142) of the main body (132) facing towards the movable component (106) in the mounted state of the sealing element (100) is subjected to a finishing operation after a shaping step.

46. Method according to any one of embodiments 35 to 45, characterized in that one or more sealing edges (128) and/or indentations (152) and/or recesses (150) are formed and/or subjected to a finishing operation by means of turning and/or machining.

47. Method according to embodiment 46, characterized in that the turning and/or machining is performed with use of an axially and radially movable tool, which is guided axially and radially along the main body (100) in accordance with an inner contour of said main body to be produced.

48. Method according to any one of embodiments 46 or 47, characterized in that the turning and/or machining is performed with use of a tool which comprises a processing edge, in particular a processing blade, complementary to the inner contour of the main body (100) to be produced.

49. Method according to embodiment 48, characterized in that the tool is guided against the main body (100) from the inside out in a radial direction, in particular in such a way that the desired inner contour of the main body (132) is completed in a processing step without axial movement.

50. Method according to any one of embodiments 35 to 49, characterized in that the thermoplastic material is produced as a compound material from (according to weight and/or volume) approximately 94% fluoropolymer, approximately 4% carbon fiber, and approximately 2% graphite.

51. Method according to any one of embodiments 35 to 50, characterized in that the thermoplastic material is brought in succession, in successive zones of a plasticizing unit of a compounding facility, to the following temperatures: 80±20° C., 340±20° C., 360±20° C., 365±20° C., 350±20° C., 340±20° C.

52. Method according to any one of embodiments 35 to 51, characterized in that the thermoplastic material is brought in succession, in successive zones of a plasticizing unit of an injection molding facility for producing sealing elements (100), to the following temperatures: 350±20° C., 365±20° C., 370±20° C., 375±20° C., 380±20° C.

The invention claimed is:

1. A sealing element for providing a seal between a first media space filled with a first medium and a second media space filled with a second medium in the region of a movable component, which is guided or guidable through the sealing element displaceably along a longitudinal axis of the movable component and/or rotatably along the longitudinal axis,
    wherein the sealing element comprises a main body, which has two dynamic sealing portions which abut or are abuttable against the movable component,
    wherein each dynamic sealing portion has a sealing lip, wherein each sealing lip comprises one, two or more sealing edges,
    wherein the main body consists of a partially fluorinated or fully fluorinated thermoplastic material,
    wherein the main body in part has a surface finish of a body shaped or completed in an injection molding process,
    wherein the main body in part has a surface finish of a body shaped or completed by means of turning and/or machining,
    wherein a diameter of the movable component is at most approximately 18 mm, and
    wherein, in a completed state of the main body, a sealing lip angle of one or both sealing lips, which is enclosed on the one hand by a surface or upper side of a sealing lip facing away from at least one sealing edge and which is enclosed on the other hand by the axis of symmetry of the sealing element, is at least approximately 2° and at most approximately 8°.

2. The sealing element according to claim 1, wherein the main body is an injection-molded component and/or consists of an injection moldable, partially fluorinated or fully fluorinated thermoplastic material.

3. The sealing element according to claim 1, wherein a spacing (A) between a sealing edge which is an outer sealing edge in the axial direction and a recess adjoining this sealing edge in a manner directed inwardly in the axial direction is at least approximately 0.5 mm.

4. The sealing element according to claim 1, wherein a spacing (A) between a sealing edge which is an outer sealing edge in the axial direction and a recess adjoining this sealing edge in a manner directed inwardly in the axial direction is at most approximately 1.5 mm.

5. The sealing element according to claim 1, wherein a spacing (A) between a sealing edge which is an inner sealing edge in the axial direction and a recess adjoining this sealing edge in a manner directed inwardly in the axial direction is at least approximately 0.5 mm.

6. The sealing element according to claim 1, wherein a spacing (A) between a sealing edge which is an inner sealing edge in the axial direction and a recess adjoining this sealing edge in a manner directed inwardly in the axial direction is at most approximately 2.5 mm.

7. The sealing element according claim 1, wherein two flank lengths of adjacent sealing edges of a sealing lip or all sealing lips differ from one another by at most approximately 15%.

8. The sealing element according to claim 1, wherein a flank length of a sealing edge which is an inner sealing edge in the axial direction is smaller than a flank length of a sealing edge which is an outer sealing edge in the axial direction by at least approximately 0.05 mm.

9. The sealing element according to claim 1, wherein a flank length of a sealing edge which is an outer sealing edge in the axial direction is smaller than a flank length of a sealing edge which is an inner sealing edge in the axial direction by at least approximately 0.05 mm.

10. The sealing element according to claim 1, wherein a sealing edge angle which is enclosed on the one hand by a flank of the sealing edge adjoining a sealing edge in a manner directed inwardly in the axial direction and on the other hand by an axis of symmetry of the sealing element, is at least roughly of equal size for each sealing edge, wherein the sealing edge angles of adjacent sealing edges of a sealing lip or of all sealing lips differ from one another by at most approximately 15%.

11. The sealing element according to claim 1, wherein a diameter of the movable component is at least approximately 4 mm and/or at most approximately 13 mm.

12. The sealing element according to claim 1, wherein a sealing edge radius of a sealing edge which is an inner sealing edge in the axial direction and/or a sealing edge radius of a sealing edge which is an outer sealing edge in the axial direction is at least approximately 0.1 mm.

13. The sealing element according to claim 1, wherein a sealing edge radius of a sealing edge which is an inner sealing edge in the axial direction and/or a sealing edge radius of a sealing edge which is an outer sealing edge in the axial direction are/is at most approximately 0.5 mm.

14. The sealing element according to claim 1, wherein a sealing lip thickness (D) at a narrowest point on an inner side of a sealing edge which is an inner sealing edge in the axial direction is at least approximately 0.4 mm.

15. The sealing element according to claim 1, wherein a sealing lip thickness (D) at a narrowest point on an inner side of a sealing edge which is an inner sealing edge in the axial direction is at most approximately 1.0 mm.

16. The sealing element according to claim 1, wherein a sealing lip thickness (D) at a narrowest point between a sealing edge which is an inner sealing edge in the axial direction and a sealing edge which is an outer sealing edge in the axial direction is at least approximately 0.3 mm.

17. The sealing element according to claim 1, wherein a sealing lip thickness (D) at a narrowest point between a sealing edge which is an inner sealing edge in the axial direction and a sealing edge which is an outer sealing edge in the axial direction is at most approximately 0.9 mm.

18. The sealing element according to claim 1, wherein a height difference between a sealing edge and a recess adjoining said sealing edge in a manner directed inwardly in the axial direction and/or a storage depth of the sealing lip is at least approximately 0.1 mm.

19. The sealing element according to claim 1, wherein a height difference between a sealing edge and a recess adjoining said sealing edge in a manner directed inwardly in the axial direction and/or a storage depth of the sealing lip is at most approximately 0.4 mm.

20. A high-pressure pump, comprising at least one sealing element according to claim 1.

21. The high-pressure pump according to claim 20 wherein the high-pressure pump is adapted for injecting a fuel into an internal combustion engine.

22. The high-pressure pump according to claim 20 wherein the at least one seal element is configured as a rod seal, piston seal and/or shaft seal.

23. A method for producing a sealing element according to claim 1 comprising:
producing the main body of the sealing element from a partially fluorinated or fully fluorinated thermoplastic material,
wherein the producing comprises:
injection molding the partially fluorinated or fully fluorinated thermoplastic material to form the main body, wherein the main body obtains only part of its final outer shape in the injection molding process, and
turning and/or machining the main body, wherein the main body of the sealing element obtains at least part of its final outer shape by means of the turning and/or machining.

24. The method according to claim 23, wherein the main body is coated fully or in part.

25. The method according to claim 23, wherein one or more sealing edges of the sealing element are produced by machining of the main body.

26. The method according to claim 23, wherein the main body, in the injection molding step, obtains a first shape, with which a sealing lip angle of one or both sealing lips of the dynamic sealing portion is approximately 3° or less.

27. The method according to claim 26, wherein the main body is subjected to a thermal and/or mechanical post-treatment in such a way that the sealing lip angle of one or both sealing lips of the dynamic sealing portion is increased to more than approximately 3°.

28. The sealing element according to claim 1, wherein the main body comprises one or more radially outer static sealing portions.

29. The sealing element according to claim 28, wherein the radially outer static sealing portions have a surface finish of a body shaped or completed in an injection molding process.

30. The sealing element according to claim 1, wherein the dynamic sealing portions have a surface finish of a body shaped or completed by means of turning and/or machining.

* * * * *